UNITED STATES PATENT OFFICE.

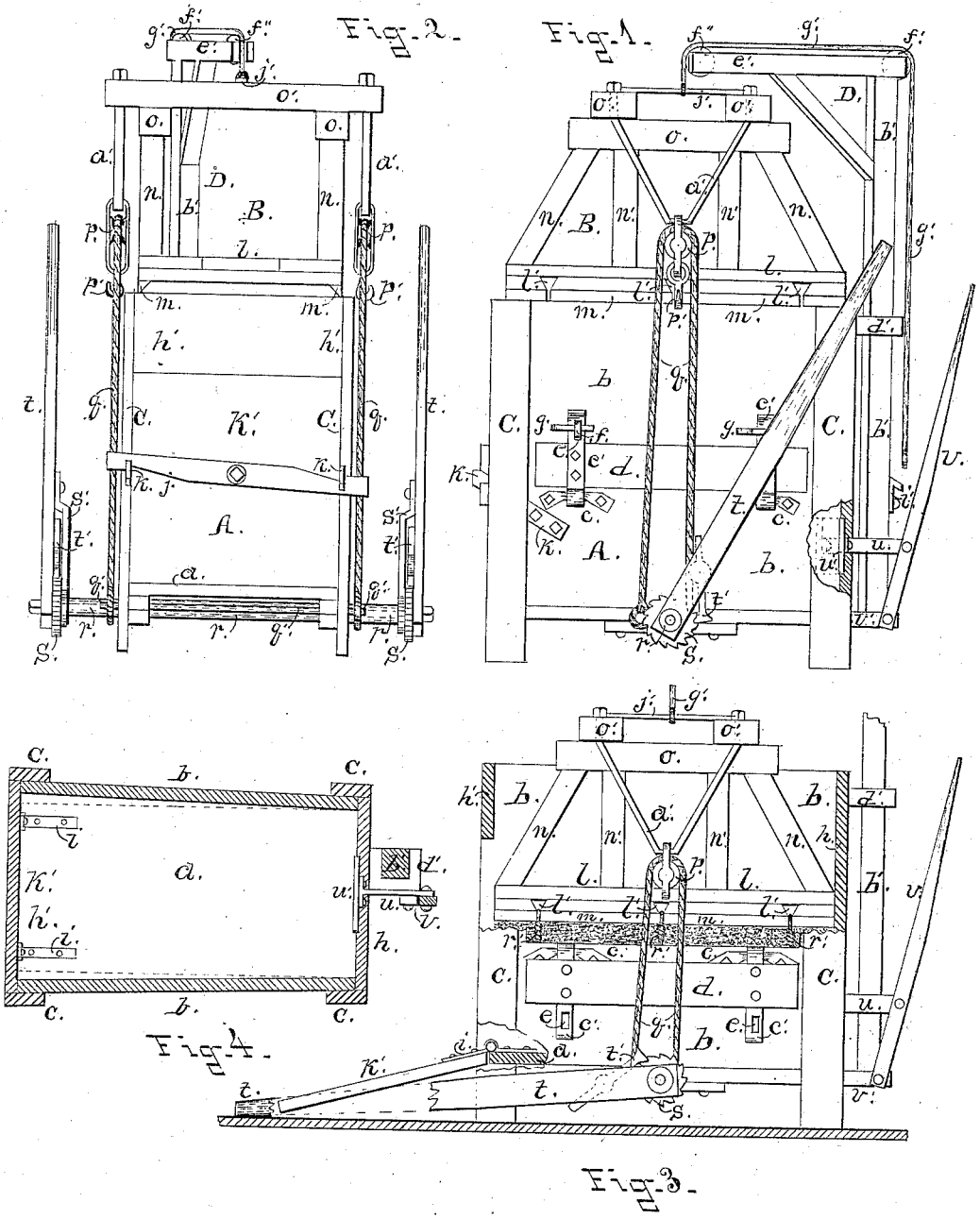

GEORGE W. SMITH, OF BAY CITY, MICHIGAN.

BALING-PRESS.

SPECIFICATION forming part of Letters Patent No. 312,915, dated February 24, 1885.

Application filed December 22, 1884. (No model.)

*To all whom it may concern:*

Be it known that I, GEORGE W. SMITH, a citizen of the United States, and a resident of Bay City, in the county of Bay and State of Michigan, have invented a new and useful Improvement in Baling-Presses, of which the following is a specification.

My invention relates to improvements in which a case consisting of four sides and a bottom is used for receiving the material to be pressed, and a follower arranged to pass within the said case is operated to press the material into a bale; and the object of my invention is to produce a means of easily and effectively compressing the loose material into a compact bale and produce a means of easily and quickly removing the bale from the case, and also provide a means of easily removing the follower after the bale is formed. I attain these objects by means of the mechanism illustrated in the accompanying drawings, in which—

Figure 1 is a side elevation of my improved baling-press prepared for pressing the loose material into a bale. Fig. 2 is an end view of the same. Fig. 3 is a side view showing the bale pressed and ready to be removed. Fig. 4 is a horizontal section of the same.

Similar letters refer to similar parts throughout the several views.

A represents a case for receiving the material to be packed into a bale, and B is a follower to press upon the material.

C are legs which support the case A, and also assists in securing it together.

$a$ represents the bottom of the case A, and $b$ are the sides, which are firmly secured to the bottom $a$, and provided with the doors $d$, which are located about midway between the bottom and top edges of the sides and are secured to the side pieces, $b$, by the hinges $c$, the part $c'$ extending entirely across and beyond the door, and its ends are provided with the slot $e$, which passes over the staples $f$, and is there secured by the key $y$.

$h$ is one end of the case, which is rigidly secured to the bottom $a$ and the sides $b$, and the opposite end is divided, the upper part, $h'$, being firmly secured to the side pieces, $b$, while the lower part, $k'$, is secured to the bottom $a$ by the hinges $i$, and is secured in a closed position by the clamping-bar $j$ and hooks $k$, which are attached to the sides $b$, so that the part $k'$ may be let down to allow the bale to be pushed out of the openings thus formed.

$l$ is a platform extending over the whole area of the inside of the case, and is provided on its under side with the triangular grooves $l'$, through which to pass the twine for tying the bale.

$m$ are triangular pieces secured to the bottom side of the platform $l$, and close to the side edges thereof, and serve to slightly round the corners of the bale when it is being pressed.

To the upper side of the platform $l$ is secured one end of the slanting posts $n$ and the vertical posts $n'$. The posts $n'$ and $n$ extend upward to some distance, and are secured to the under side of the pieces $o$, and across the pieces $o$, and to the upper side thereof are securely fastened the pieces $o'$. These pieces $o'$ extend considerably beyond the side pieces, $b$, and are provided with the stirrup $a'$, the ends of the stirrup passing through the pieces $o'$, while its middle portion, which hangs downward, is provided with the pulleys $p$ and hooks $p'$.

$q$ is a rope or chain one end of which is secured to the case by suitable means, as a bar, $q'$, passed beneath the bottom of the case A. The rope or chain $q$ is then passed over the pulleys $p$, and again brought downward and passed around the roller $r$, which is located across and beneath the bottom of the case A, and is secured by suitable bearings to the same, and, extending beyond the sides of the case to some distance, is provided near its ends with the ratchet-wheels S.

Pivoted to the outer ends of the roller $r$ are the levers $t$, and attached to the levers $t$, a short distance from the pivoted ends thereof, are the pawls $t'$, which are arranged and adapted to catch into the teeth of the wheels S, so that when the levers are moved in a proper direction the roller $r$ is caused to revolve, and when the levers $t$ are moved in the opposite direction the pawls $t'$ will slide over the teeth in the wheels S and the roller $r$ will remain stationary.

Attached to the inner sides of the levers $t$, and near the middle thereof, is one end of the supports S', and near this end the supports are bent away from the levers, and also downward, in such a manner that the ratchet-wheels S shall be between the said supports and the levers t, and at their lower or opposite ends are provided with holes, through which passes the roller r. These supports S' serve to brace the levers and hold them in a proper position to allow the pawls t' to always catch into the teeth of the ratchet-wheels S.

Passing through the solid end piece, h, and with a plate, u', secured to its inner end, is the push-bar u, the outer end of the bar u being pivoted at a short distance from its lower end to the lever v, the lower end of the lever v being pivoted to the support v', which is attached to the lower part of the case, so that when the bale is tied and ready to be removed from the case the upper end of the lever v is pushed toward the case. This propels the push-bar u and plate u' against the bale and starts it loose from the case.

D is a crane, used to lift the follower B out of the case after the bale is finished, and consists of the upright piece b', placed vertically in proper supports d', which are attached to the end h, and is provided at its upper end with an arm, e', properly braced. Each end of the arm e' is provided with the pulleys f' and f". Over these pulleys pass the rope g', one end of the rope being provided with a loop arranged to catch upon the hook i', while the opposite end is secured to the bail j', which is attached to the cross-piece o' in the follower. By pulling the rope g' and catching the said loop on the hook i' the follower B is raised from the case A and may be swung around out of the way of the filling of the case. Cords or wire r' are placed in a suitable position within the case and the material to be packed filled in. The follower B is then swung around and placed upon the material by loosening the rope g' from the hook i'. The levers t are then operated, and the ropes or chains q are wound upon the roller r, drawing down the follower into the case until the platform l of the follower shall be just opposite the doors d, when the lever t is placed with its outer end resting upon the floor, and the pawl t' is engaged with the ratchet-wheel S, and the follower is held pressed upon the bale in the position shown in Fig. 3. The doors d are then unclosed by drawing the key g, and allowed to turn downward. The wires or cords r' are then passed through the grooves l' and the ends thereof secured together. The pawls t' are then disengaged from the ratchet-wheels S, and the roller r allowed to turn backward, which loosens the ropes or chains q and allows the follower B to be removed. The clamping-bar j is then loosened and the door k' is let down. The lever b is then actuated, and the bale is pushed partly out of the opening left by the door k', from whence it may be easily removed. As may be seen in Fig. 4, the end h' of the case A is somewhat wider than the end h, so that a bale, being started out by the push-bar u, is quite loose from the case as soon as it leaves its original position, and may be easily removed.

I am aware that a case constructed wider at one end than the other is not new, and I do not claim the same broadly; but

What I claim as my invention, and desire to secure by Letters Patent, is—

1. In a baling-press, a case composed of the bottom a, sides b, provided, as described, with the doors d, the end h, and the end h', provided with the door k' and the legs C, all in combination, substantially as set forth.

2. In a baling-press, a case for receiving the material to be packed, constructed to form a chamber of greater width at one end than the other or opposite end, the wider end being provided with a door for the removal of the bale, in combination with a rigid portion located above the said door and forming a part of the said wider end, and a support for the sides of the said case, substantially as described, and for the purpose set forth.

3. In a baling-press, a case for receiving the material to be packed, having a chamber of greater width at one end than the other, the wider end being provided with a door for the removal of the bale of pressed material, in combination with a push-bar which passes through the narrower or opposite end of the said case, the inner end of the said push-bar having a plate adapted to bear against the bale, and means, as described, for propelling the said push-bar and plate against the bale, substantially as described, and for the purpose set forth.

4. In a baling-press, the case A and follower B, provided with the projecting pieces o', and stirrups a', in combination with the ropes or chains g', the pulleys p, the roller r, the ratchet-wheels S, the pawls t', the levers t, and supports S', substantially as described, and for the purpose set forth.

5. The combination, in a baling-press, of the case A and the follower B, with a crane, D, provided with the rope g' and pulleys f' and f" and hook i', substantially as and for the purpose set forth.

6. In a baling-press, the roller r, provided with the ratchet-wheel S, and the lever t, having the pawl t' pivoted thereto, and adapted to engage with the ratchet-wheel S, in combination with the supporting-piece S', arranged and located substantially as described, and for the purpose set forth.

GEORGE W. SMITH.

Witnesses:
  G. M. FRANCIS,
  J. E. THOMAS.